US009736344B2

(12) United States Patent
Lim

(10) Patent No.: US 9,736,344 B2
(45) Date of Patent: Aug. 15, 2017

(54) 3D STEREOSCOPIC CAMERA MODULE

(75) Inventor: Haekeun Lim, Seoul (KR)

(73) Assignee: LG Innotek Co., Ltd., Seoul (KR)

(*) Notice: Subject to any disclaimer, the term of this patent is extended or adjusted under 35 U.S.C. 154(b) by 273 days.

(21) Appl. No.: 13/993,606

(22) PCT Filed: Jul. 21, 2011

(86) PCT No.: PCT/KR2011/005401
§ 371 (c)(1),
(2), (4) Date: Jun. 12, 2013

(87) PCT Pub. No.: WO2012/081790
PCT Pub. Date: Jun. 21, 2012

(65) Prior Publication Data
US 2013/0265394 A1 Oct. 10, 2013

(30) Foreign Application Priority Data
Dec. 16, 2010 (KR) .................. 10-2010-0129185

(51) Int. Cl.
G03B 3/10 (2006.01)
G02B 7/02 (2006.01)
(Continued)

(52) U.S. Cl.
CPC ....... *H04N 5/2253* (2013.01); *H04N 13/0239* (2013.01)

(58) Field of Classification Search
USPC .......................................... 348/42
See application file for complete search history.

(56) References Cited

U.S. PATENT DOCUMENTS 7,190,389 B1* 3/2007 Abe ............... G03B 35/08
348/42
7,652,833 B2* 1/2010 Honma ........... G02B 7/102
359/694
(Continued)

FOREIGN PATENT DOCUMENTS

JP 2007-057951 A 3/2007
KR 10-0762098 B1 10/2007
(Continued)

OTHER PUBLICATIONS

Korean Office Action issued in Application No. 10-2010-0129185 dated Feb. 10, 2012.
(Continued)

*Primary Examiner* — Jamie Atala
*Assistant Examiner* — Patrick Demosky
(74) *Attorney, Agent, or Firm* — KED & Associates LLP

(57) ABSTRACT

The present invention relates to a 3D stereoscopic camera module, the module including an upper case, and left and right cameras arranged on the upper case, each formed at a pre-determined space apart, wherein the left and right cameras include at least three or more coils arranged at an inner surface of the upper case, a housing arranged inside the upper case and mounted therein with a lens, at least three or more magnets mounted at the housing to face the coils, and an image sensor converting an optical signal of an image captured by the lens to an electrical signal, whereby a convergence angle can be easily controlled and an excellent short-distanced 3D stereoscopic shooting can be realized.

4 Claims, 3 Drawing Sheets

(51) Int. Cl.
*H04N 9/28* (2006.01)
*H04N 5/225* (2006.01)
*H04N 13/02* (2006.01)

(56) References Cited

U.S. PATENT DOCUMENTS

| | | | |
|---|---|---|---|
| 2008/0192124 A1* | 8/2008 | Nagasaki | G02B 7/02 348/208.11 |
| 2008/0297642 A1* | 12/2008 | Osaka | H04N 5/2254 348/335 |
| 2009/0290242 A1* | 11/2009 | Yang | G02B 7/08 359/824 |
| 2009/0303380 A1* | 12/2009 | Seo | H04N 5/2253 348/373 |
| 2011/0141564 A1* | 6/2011 | Sata | G02B 7/102 359/557 |
| 2011/0249100 A1* | 10/2011 | Jayaram | H04N 5/2253 348/48 |
| 2012/0098938 A1* | 4/2012 | Jin | H04N 13/0271 348/47 |

FOREIGN PATENT DOCUMENTS

| | | | |
|---|---|---|---|
| KR | 10-2008-0095819 | * | 9/2008 |
| KR | 1020080095819 | * | 9/2008 |
| KR | 10-0932175 B1 | | 12/2009 |
| KR | 10-2010-0033471 | * | 4/2010 |
| KR | 101083423 | | 11/2011 |
| KR | 101104195 | * | 1/2012 |

OTHER PUBLICATIONS

International Search Report dated Mar. 22, 2012 issued in Application No. PCT/KR2011/005401.

* cited by examiner

[Fig. 1]
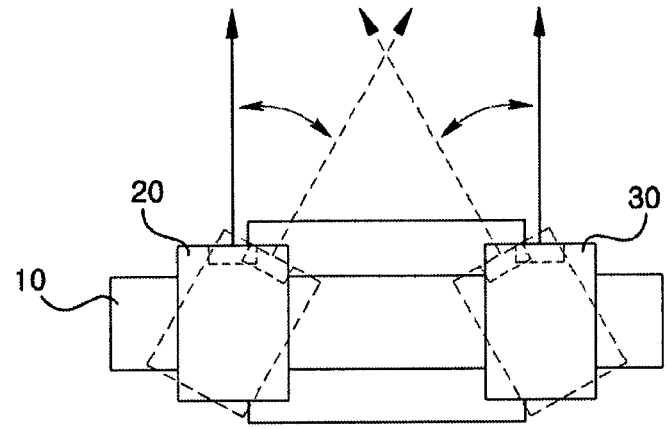
[Fig. 2]
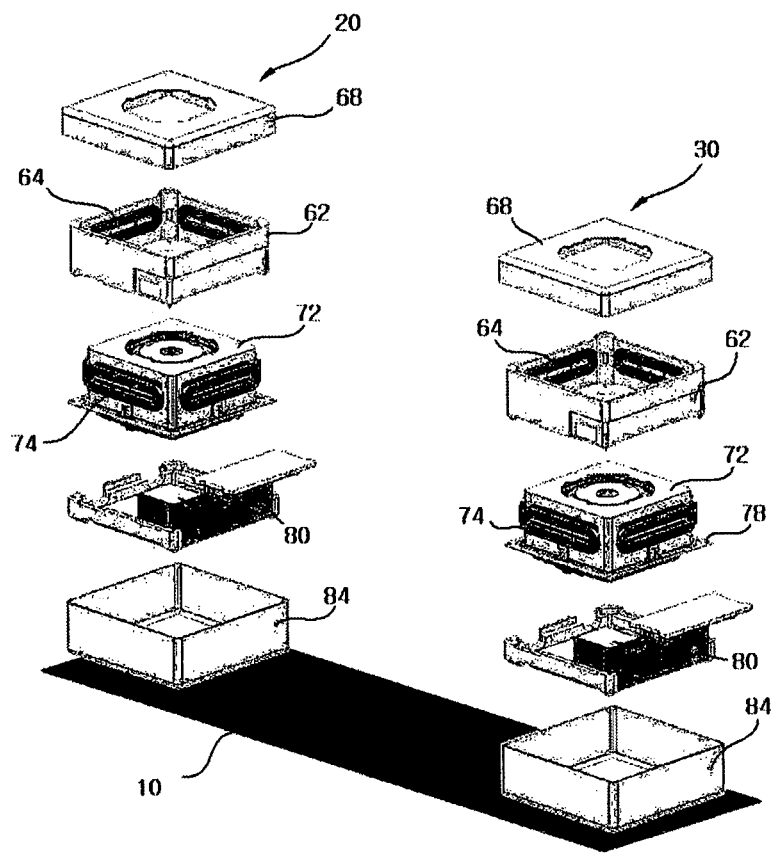

[Fig. 3]
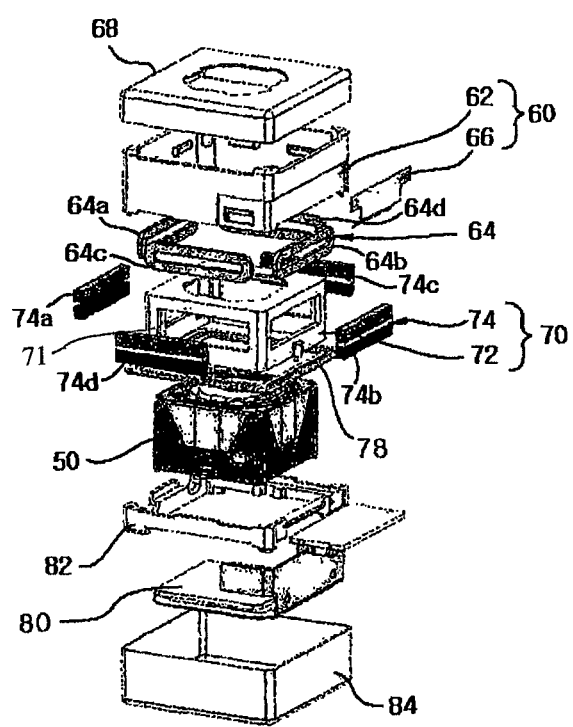

[Fig. 4]
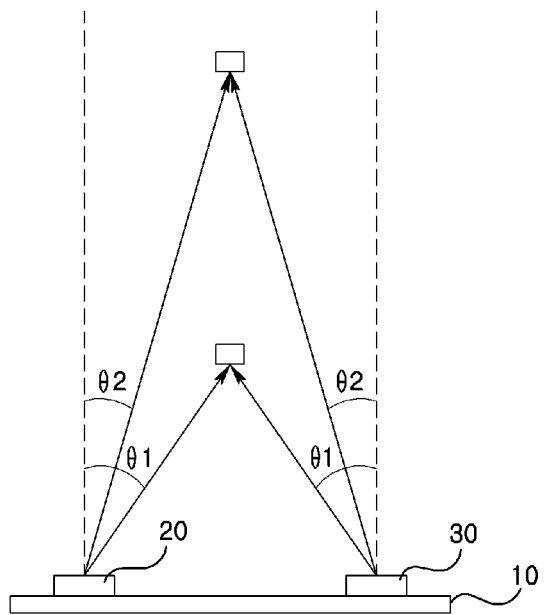

3D STEREOSCOPIC CAMERA MODULE

CROSS-REFERENCE TO RELATED PATENT APPLICATIONS

This application is a U.S. National Stage Application under 35 U.S.C. §371 of PCT Application No. PCT/KR2011/005401, filed Jul. 21, 2011, which claims priority to Korean Patent Application No. 10-2010-0129185, filed Dec. 16, 2010.

TECHNICAL FIELD

The present invention relates to a 3D stereoscopic camera module enabling to realize a 3D image.

BACKGROUND ART

Generally, two sheets or more of 2D images having mutually effective time difference are needed to realize 3D stereoscopic images. A camera employed for obtaining two sheets or more of 2D images is called a 3D stereoscopic camera. There exist various techniques and systems for producing 3D (three-dimensional) images. One type of approach is a dual lens 3D image photographing method and another type of approach is a multi-view 3D image photographing method. However, the dual lens camera is largely used.

A conventional 3D stereoscopic camera is configured in such a manner that two fixed image sensors are arranged thereon with two actuators which are horizontally moved to change a position where light from a lens is captured on the image sensor, whereby a convergence angle control can be performed.

The conventional 3D stereoscopic camera is however disadvantageous in that it may be adequate to shoot mid/far distanced 3D stereoscopic images but inadequate to shoot relatively short distanced 3D stereoscopic images because an actuator moves horizontally only.

DISCLOSURE OF INVENTION

Technical Problem

The present invention is disclosed to provide a 3D stereoscopic camera module enabling to adjust a convergence angle responsive to a distance from an object, whereby excellent 3D images are enabled that are adequate to a relatively short-distanced 3D stereoscopic shooting.

Technical problems to be solved by the present invention are not restricted to the above-mentioned, and any other technical problems not mentioned so far will be clearly appreciated from the following description by skilled in the art.

Solution to Problem

An object of the invention is to solve at least one or more of the above problems and/or disadvantages in a whole or in part and to provide at least the advantages described hereinafter. In order to achieve at least the above objects, in whole or in part, and in accordance with the purposes of the invention, as embodied and broadly described, and in one general aspect of the present invention, there is provided a 3D stereoscopic camera module, the camera module comprising: an upper case; at least three or more coils arranged at an inner surface of the upper case; a housing arranged inside the upper case and mounted therein with a lens; at least three or more magnets mounted at the housing to face the coils; and at least one or more cameras including an image sensor converting an optical signal of an image captured by the lens to an electrical signal.

Preferably, the upper case takes the shape of a rectangular parallelepiped with upper/bottom sides opened, and is mounted at a bottom surface with a bottom case.

Preferably, an exterior surface of the upper case is wrapped by an upper shield cap, and the bottom case is wrapped by a bottom shield cap.

Preferably, each of the coils takes the shape of a track and is secured at an inner surface of the upper case.

Preferably, the coil includes first and second coils arranged to an X axis direction, third and fourth coils arranged to a Y axis direction.

Preferably, each of the first, second, third and fourth coils is individually applied with an electric power.

Preferably, the magnet is secured to a mounting hole formed at the housing, and an upper side and a bottom side of the magnet are arranged with poles each having an opposite polarity.

Preferably, the magnet includes a first magnet opposite to the first coil, a second magnet opposite to the second coil, a third magnet opposite to the third coil, and a fourth magnet opposite to the fourth coil.

In another general aspect of the present invention, there is provided a 3D stereoscopic camera module, the camera module comprising: a base frame; and left and right cameras arranged on the base frame, each formed at a predetermined space apart, wherein the left and right cameras include at least three or more coils arranged at an inner surface of an upper case on the base frame, a housing arranged inside the upper case and mounted therein with a lens, at least three or more magnets mounted at the housing to face the coils, and an image sensor converting an optical signal of an image captured by the lens to an electrical signal.

Advantageous Effects of Invention

A 3D stereoscopic camera module according to the present invention has an advantageous effect in that the 3D stereoscopic camera is so configured as to be vertically and horizontally driven and tilted to ease a convergence angle control and to enable an excellent short-distanced 3D stereoscopic shooting.

BRIEF DESCRIPTION OF DRAWINGS

FIG. 1 is a plan view of a 3D stereoscopic camera module according to an exemplary embodiment of the present invention.

FIG. 2 is an exploded perspective view of a 3D stereoscopic camera module according to an exemplary embodiment of the present invention.

FIG. 3 is an exploded perspective view of a camera according to an exemplary embodiment of the present invention.

FIG. 4 is an operational state view of a 3D stereoscopic camera module according to an exemplary embodiment of the present invention.

BEST MODE FOR CARRYING OUT THE INVENTION

The disclosed embodiments and advantages thereof are best understood by referring to FIGS. 1-4 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

Meanwhile, the terminology used herein is for the purpose of describing particular implementations only and is not intended to be limiting of the invention. The terms "first," "second," and the like, herein do not denote any order, quantity, or importance, but rather are used to distinguish one element from another, and the terms "a" and "an" herein do not denote a limitation of quantity, but rather denote the presence of at least one of the referenced item. That is, as used herein, the singular forms "a", "an" and "the" are intended to include the plural forms as well, unless the context clearly indicates otherwise.

For example, a second constituent element may be denoted as a first constituent element without departing from the scope and spirit of the present disclosure, and similarly, a first constituent element may be denoted as a second constituent element.

It will be understood that, although the terms first, second, etc. may be used herein to describe various elements, these elements should not be limited by these terms. These terms are only used to distinguish one element from another. For example, a first region/layer could be termed a second region/layer, and, similarly, a second region/layer could be termed a first region/layer without departing from the teachings of the disclosure.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Also, "exemplary" is merely meant to mean an example, rather than the best. In the drawings, the size and relative sizes of layers, regions and/or other elements may be exaggerated or reduced for clarity. Like numbers refer to like elements throughout and explanations that duplicate one another will be omitted.

The meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

Now, the present invention will be described in detail with reference to the accompanying drawings.

FIG. 1 is a plan view of a 3D stereoscopic camera module according to an exemplary embodiment of the present invention, and FIG. 2 is an exploded perspective view of a 3D stereoscopic camera module according to an exemplary embodiment of the present invention.

Referring to FIGS. 1 and 2, a 3D stereoscopic camera module includes a base frame (10), and left/right cameras (20, 30) arranged on the base frame, each spaced apart at a predetermined distance. The left/right cameras (20, 30) are so configured as to be horizontally and vertically driven and tilted, enabling to realize a 3D stereoscopic camera resembling eyes of a human being.

Each of the left/right cameras (20, 30) has the same structure. Now, structure of one of the left/right cameras (20, 30) will be described. As shown in FIG. 3, the camera includes a camera lens (50), a fixture (60) into which a power is applied, a movable unit (70) arranged inside the fixture (60) at a predetermined space, mounted with the camera lens (50) and vertically driving and tilting the camera lens (50) in association with the fixture (60), and an image sensor (80) receiving light that is incident on the camera lens. The camera lens (50) includes an infrared filter.

The fixture (60) includes an upper case (62) taking the shape of a rectangular parallelepiped with upper/bottom sides opened, at least three or more coils (64) arranged at four inner surfaces of the upper case (62), and a coil FPCB (Flexible Printed Circuit Board) connected to each of the coils (64) to connect the coil (64) to a power source.

The upper case (62) is preferably made of plastic for insulating an interior from an exterior, and may be injection molded for mass production Furthermore, the exterior of the upper case (62) is wrapped by an upper shield cap (68). The coil (64) includes a first coil (64*a*) secured at an inner surface of the upper case (62) and wrapped in the shape of a track, a second coil (64*b*) secured at an inner surface of the upper case (62) and arranged at a place facing the first coil (62*a*), third and fourth coils (64*c*, 64*d*) perpendicularly arranged to the first and second coils (64*a*, 64*b*) and arranged at places facing the first and second coils (64*a*, 64*b*). That is, the first and second coils (64*a*, 64*b*) are arranged to an X axis direction and the third and fourth coils (64*c*, 64*d*) are arranged to a Y axis direction. The plurality of coils (64*a*, 64*b*, 64*c*, 64*d*) are respectively connected to a coil FPCB (Flexible Printed Circuit Board, 66) and is individually applied with a separate electric power.

The movable unit (70) includes a housing (72) inserted into the upper case (62), taking the same shape of a rectangular parallelepiped and secured by a lens assembly, and magnets (74) mounted at four surfaces of the housing (72) where the number of magnets is same as that of coils.

The magnet takes the shape of a rectangle, and is inserted into a mounting hole (71) formed at a lateral surface of the housing (72). The magnet (74) is secured to a mounting hole formed at the housing, and an upper side and a bottom side of the magnet are arranged with poles each having an opposite polarity. That is, if the upper side is an S pole, the bottom side is an N pole.

The magnet (74) includes a first magnet (74*a*) disposed opposite to the first coil (64*a*) for interaction therebetween, a second magnet (74*b*) disposed opposite to the second coil (64*b*) for interaction therebetween, a third magnet (74*c*) disposed opposite to the third coil (64*c*) for interaction therebetween, and a fourth magnet (74*d*) disposed opposite to the fourth coil (64*d*) for interaction therebetween.

Furthermore, the housing (72) is mounted thereunder with a leaf spring (78) for elastically supporting the housing (72).

The image sensor (50) is mounted at a PCB (Printed Circuit Board), which is in turn mounted at the bottom case (82) and accommodated inside a bottom shield can (84). The image sensor (50) is a semiconductor device functioning to shoot an image of a man or an object, and converts an optical signal of the image captured by a lens to an electrical signal for photographing of the image.

MODE FOR THE INVENTION

Now, an operation of the 3D stereoscopic camera module thus configured according to an exemplary embodiment of the present invention will be described.

FIG. 4 is an operational state view of a 3D stereoscopic camera module according to an exemplary embodiment of the present invention.

First of all, in a case an electric power is applied to both the coils (64a, 64b) on the X axis and to the coils (64c, 64d) on the Y axis, or is applied to one of the coils (64a, 64b) on the X axis and to the coils (64c, 64d) on the Y axis in order to vertically drive the camera lens (50), the housing (72) is vertically driven by the interaction between the coil (64) and the magnet (74), whereby the camera lens (50) secured to the housing (72) is vertically driven.

In a case an electric power of opposite direction is applied to the coils (64a, 64b) on the X axis and/or to the coils (64c, 64d) on the Y axis, in order to tilt the camera lens (50), the first coil (64a) and the first magnet (74a) are interacted to descend a lateral surface of the housing (72), while the second coil (64b) and the second magnet (74b) are interacted to ascend the other lateral surface of the housing (72), whereby the camera module is tilted.

Likewise, the lateral surface of the housing (72) is descended by interaction between the third coil (64c) and the third magnet (74c), and the other lateral surface of the housing (72) ascend by the interaction between the fourth coil (64d) and the fourth magnet (74d), whereby the camera module is tilted.

As a result, as shown in FIG. 4, convergence angles can be controlled. That is, in a case the left camera (20) is tilted to the right direction, the right camera (30) is tilted to left direction in the same angle as that of the left camera to control convergence angles (θ1, θ2).

In a case a far-away object is to be shot, the convergence angle (θ2) becomes smaller, and in a case a near object is to be shot, the convergence angle (θ1) becomes larger. In the present exemplary embodiment, the 3D stereoscopic camera module can tilt both the left and right cameras to make it easy to control the convergence angles.

INDUSTRIAL APPLICABILITY

The present invention has an industrial applicability in that the 3D stereoscopic camera module is so configured as to be vertically and horizontally driven and tilted to ease a convergence angle control and to enable an excellent short-distanced 3D stereoscopic shooting.

Although the present invention has been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A 3D stereoscopic camera module, the camera module comprising:
a base frame;
a first camera arranged on the base frame; and
a second camera having a same structure as the first camera, and the second camera spaced apart from the first camera on the base frame,
wherein one of the first and second cameras includes:
an upper case having a shape of a rectangular parallel-epiped with upper and bottom sides opened;
a plurality of coils including first, second, third, and fourth coils disposed at inner surfaces of the upper case;
a housing formed with a plurality of magnet mounting holes at lateral surfaces thereof;
an elastic member for elastically supporting the housing within the upper case;
a plurality of magnets having first, second, third and fourth magnets each secured to a corresponding one of the magnet mounting holes of the housing;
a camera lens mounted in the housing and disposed over an image sensor;
a coil Flexible Printed Circuit Board (FPCB) connected to the plurality of coils to apply power to any of the plurality of coils; and
a bottom case mounted at a bottom surface of the upper case,
wherein an exterior surface of the upper case is wrapped by an upper shield cap, and the bottom case is wrapped by a bottom shield cap,
wherein a first driving unit includes the first and second coils arranged in an X axis direction, and the first and second magnets facing the first and second coils, respectively,
wherein a second driving unit includes the third and fourth coils arranged in a Y axis direction, and the third and fourth magnets facing the third and fourth coils, respectively,
wherein when an electric current of a same direction is selectively and respectively applied to the first and second coils of the first driving unit, and/or to the third and fourth coils of the second driving unit of the first and second cameras, at least one camera lens secured to the housing of the first and second cameras is configured to be vertically driven,
wherein when a first electric current of opposite direction is selectively applied to the first and second coils of the first driving unit and/or the third and fourth coils of the second driving unit of the first camera and a second electric current of reverse direction to the first electric current is applied to those of the second camera, respectively, an inner lateral surface of the housing of the first and second cameras is configured to move downward and an outer lateral surface of the housing of the first and second cameras is configured to move upward, such that each camera lens secured to the housing of the first and second cameras to adjust a convergence angle between the first and second cameras,
wherein the first and second cameras are configured to simultaneously adjust the convergence angle with a same degree where the first camera is tilted to the left toward the second camera in a predetermined angle and the second camera is tilted to the right toward the first camera in the same angle as that of the first camera, and wherein when a convergence angle ($\theta 1$) defines an angle to shoot a first object and a convergence angle ($\theta 2$) defines an angle to shoot a second object, wherein the first object is closer to the housing than the second object, and wherein the first and second cameras are driven to make the convergence angle ($\theta 2$) smaller than the convergence angle ($\theta 1$).

2. The 3D stereoscopic camera module of claim 1, wherein each coil of the first and second driving units has a shape of a track.

3. The 3D stereoscopic camera module of claim 1, wherein each of the first, second, third and fourth coils is individually applied with a separate electric current.

4. The 3D stereoscopic camera module of claim 1, wherein an upper side and a bottom side of the magnet are arranged with poles each having an opposite polarity.

\* \* \* \* \*